US008693548B2

(12) United States Patent
Stojancic et al.

(10) Patent No.: US 8,693,548 B2
(45) Date of Patent: *Apr. 8, 2014

(54) METHODS AND APPARATUS FOR MOTION SEARCH REFINEMENT IN A SIMD ARRAY PROCESSOR

(71) Applicants: Mihailo M. Stojancic, San Jose, CA (US); Gerald George Pechanek, Cary, NC (US)

(72) Inventors: Mihailo M. Stojancic, San Jose, CA (US); Gerald George Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,925

(22) Filed: Jan. 23, 2013

(65) Prior Publication Data

US 2013/0182771 A1    Jul. 18, 2013

Related U.S. Application Data

(63) Continuation of application No. 11/736,670, filed on Apr. 18, 2007, now Pat. No. 8,385,419.

(60) Provisional application No. 60/795,138, filed on Apr. 26, 2006.

(51) Int. Cl.
*H04N 7/12* (2006.01)

(52) U.S. Cl.
USPC .............. 375/240.16; 375/240.21; 348/721

(58) Field of Classification Search
USPC ................. 375/240.16–240.17, 240.29
See application file for complete search history.

(56) References Cited

U.S. PATENT DOCUMENTS

| 6,483,951 | B1* | 11/2002 | Mendenhall et al. ......... 382/300 |
| 6,622,234 | B1* | 9/2003 | Pechanek et al. ............... 712/22 |
| 7,257,696 | B2* | 8/2007 | Pechanek et al. ............... 712/24 |
| 7,529,302 | B2* | 5/2009 | Mukerjee et al. ........ 375/240.15 |
| 7,630,438 | B2* | 12/2009 | Mukerjee et al. ........ 375/240.16 |
| 7,852,936 | B2* | 12/2010 | Mukerjee et al. ........ 375/240.15 |
| 2005/0058204 | A1* | 3/2005 | Fernandes ................ 375/240.16 |
| 2006/0133506 | A1* | 6/2006 | Dang ....................... 375/240.17 |
| 2008/0133892 | A1* | 6/2008 | Pechanek et al. ............. 712/220 |

* cited by examiner

*Primary Examiner* — Darren B Schwartz
*Assistant Examiner* — John B King
(74) *Attorney, Agent, or Firm* — Law Offices of Peter H. Priest, PLLC

(57) ABSTRACT

Various approaches for motion search refinement in a processing element are discussed. A k/2+L+k/2 register stores an expanded row of an L×L macro block. A k-tap filter horizontally interpolates over the expanded row generating horizontal interpolation results. A transpose storage unit stores the interpolated results generated by the k-tap filter for k/2+L+k/2 entries, wherein rows or columns of data may be read out of the transpose storage unit in pipelined register stages. A k-tap filter vertically interpolates over the pipelined register stages generating vertical interpolation results.

20 Claims, 4 Drawing Sheets

METHODS AND APPARATUS FOR MOTION SEARCH REFINEMENT IN A SIMD ARRAY PROCESSOR

RELATED U.S. APPLICATION DATA

The present application is a continuation of U.S. Ser. No. 11/736,670 filed Apr. 18, 2007 and claims the benefit of U.S. Provisional Application No. 60/795,138, filed Apr. 26, 2006, which are incorporated by reference herein in their entirety.

FIELD OF THE INVENTION

The present invention relates generally to improvements in parallel data processing architectures for video processing and more particularly to apparatus and methods for motion search refinement in a single instruction multiple data (SIMD) array processor.

BACKGROUND OF THE INVENTION

Increasing demand for high definition TV products, including interactive TV in a HD format and HD video compression encoding and decoding, requires increasing sophistication, flexibility, and performance in the supporting electronics. The sophistication, flexibility, and performance requirements for HD TV exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which can be supported to improve image quality and further reductions in compression bandwidth. Due to these multiple demands, a flexible parallel processing approach must be found to meet the demands in a cost effective manner.

A number of algorithmic capabilities are generally common between multiple video encoding standards, such as MPEG-2, H.264, and SMPTE-VC-1. Motion estimation/compensation and deblocking filtering are two examples of general algorithms that are required for video encoding. To efficiently support motion estimation algorithms and other complex programmable functions which may vary in requirements across the multiple standards, a processor by itself would require significant parallelism and very high clock rates to meet the requirements. A processor of this capability would be difficult to develop in a cost effective manner for commercial products.

Motion estimation/compensation methods exploit the temporal picture structure of a video sequence by reducing the redundancy inherent in the sequential picture frames. They represent a central part of the video encoding process of MPEG-4 AVC H.264 and SMPTE-VC-1 video encoding standards. These methods are computationally the most expensive part of a digital video encoding process. On average they take about 60-80% of the total available computational time, thus having the highest impact on the speed of the overall encoding. They also have a major impact on the visual quality of encoded video sequences.

The most common motion estimation/compensation algorithms are block matching algorithms operating in the time domain. Here motion vectors are used to describe the best temporal prediction for a current block of pixels to be encoded. A time domain prediction error between the current block of pixels and the reference block of pixels is formed, and a search is performed to minimize this value.

The process of half pixel motion search refinement for HD TV picture frame sizes is computationally very intensive due to the requirement to apply a 6-tap FIR filter on a two-dimensional array of pixels in order to produce half pixel values. In addition, an intermediate step of transposition of the two-dimensional array is needed which requires memory addressing on pixel boundaries, thus demanding a prohibitive number of extra computational cycles from a processor in the array.

It will be highly advantageous to efficiently address such problems as discussed in greater detail below.

SUMMARY OF THE INVENTION

In one or more of its several aspects, the present invention addresses problems such as those described above. In one of its aspects, the present invention describes an apparatus that allows improvements in processor node capability in a SIMD array processor.

An embodiment of the present invention addresses an apparatus for motion search refinement in a processing element. A k/2+L+k/2 register stores an expanded row of an L×L macro block. A k-tap filter horizontally interpolates over the expanded row generating horizontal interpolation results. A transpose storage unit stores the interpolated results generated by the k-tap filter for k/2+L+k/2 entries, wherein rows or columns of data may be read out of the transpose storage unit in pipelined register stages. A k-tap filter vertically interpolates over the pipelined register stages generating vertical interpolation results.

Another embodiment of the present invention addresses a method for motion search refinement in a processing element. Initiating the motion search refinement with a motion search refinement instruction operating in a processing element of the array processor. Storing k/2+L+k/2 pixels of an L×L macro block in an expanded row register. Interpolating horizontally over the expanded row with a k-tap filter for providing horizontal interpolation results. Storing values from the horizontal interpolation results for k/2+L+k/2 entries in a transpose storage unit, wherein rows or columns of data may be read out of the transpose storage unit in pipelined register stages. Interpolating vertically over the pipelined register stages with a k-tap filter for providing vertical interpolation results.

These and other features, aspects, techniques, and advantages of the present invention will be apparent to those skilled in the art from the following detailed description, taken together with the accompanying drawings and claims.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Further details of attaching an application specific hardware assist function within an array processor for use in conjunction with the present invention is found in U.S. Provisional Application Ser. No. 60/795,140 entitled "Methods and Apparatus for Attaching Application Specific Functions Within an Array Processor" filed Apr. 26, 2006 and incorporated by reference herein in its entirety.

Figure 1:
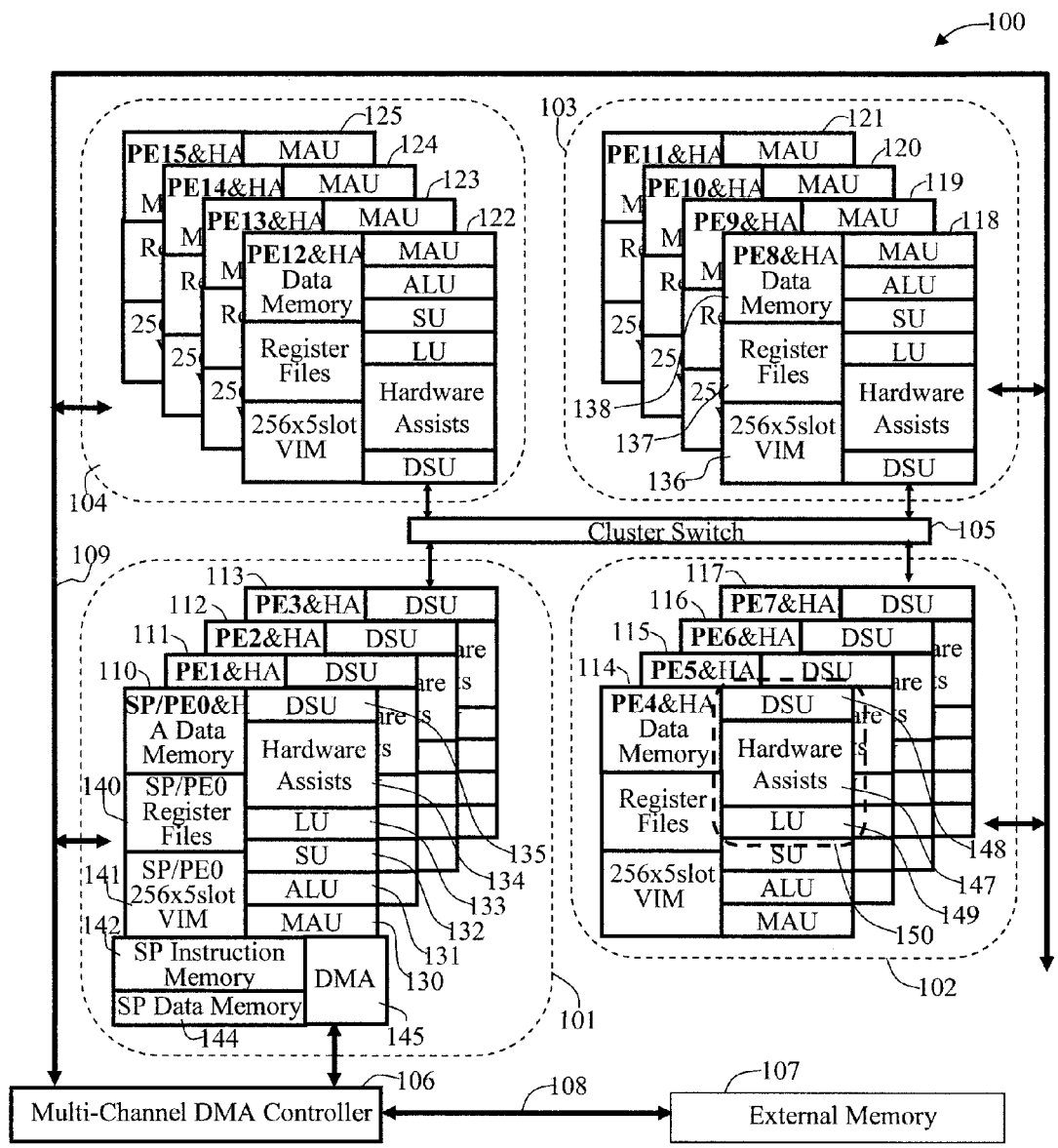
FIG. 1 illustrates a sixteen node video signal processor (VSP$_{16}$) in accordance with the present invention.

FIG. 1 illustrates a sixteen-node video signal processor ($VSP_{16}$) 100 in accordance with one or more embodiments of the present invention. The $VSP_{16}$ 100 contains four transform engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multi-channel DMA bus 109.

Sixteen processor engines (PEs) 110-125 are partitioned in groups of four PEs per cluster as a 4×4 array organization. Each PE provides programmable processing and hardware assist functions. SP/PE0 110 is unique as compared to the other fifteen PEs 111-125, having an array controlling function combined with the PE function of PE0. The common features of the sixteen PEs 110-125 include a set of instruction execution units including a multiply accumulate unit (MAU) 130, an arithmetic logic unit (ALU) 131, a store unit (SU) 132, a load unit (LU) 133, a hardware assist (HA) 134, a data select unit (DSU) 135, a 256×5 slot very long instruction word memory (VIM) 136, a local PE register file 137, and a data memory local 138 local to each PE and HA. Each PE also contains local pipeline controls, decode logic, and control logic appropriate for each PE. All $VSP_{16}$ instructions are executed in a simple pipeline with a majority of instructions requiring a single execution stage and a few instructions requiring two execution stages that are pipelined.

The unique SP/PE0 110 combines a controlling function sequence processor (SP) combined with PE0 functions. To support the SP and PE0, a separate SP register file and a separate PE0 register file, illustrated in one block as SP/PE0 register files 140 are used to maintain the processing context of the SP and PE0. Though not limited to this, the SP/PE0 shares a single VIM 141. To control the $VSP_{16}$ the SP has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching and issuing of instructions such as load VLIW and execute VLIW instructions. The load VLIW instruction provides an indirect VIM address and is used to load the instruction slots at the specified VIM address. The execute VLIW instruction causes a VLIW to be selected at a specified indirect VIM address and executed.

The single SP thread of control supports 4×4 sub-threads which operate synchronously in lock step single instruction multiple data (SIMD) fashion. Each sub-thread uses very long instruction words (VLIWs) which are indirectly selected and executed by the single SP thread. Each VLIW in each PE at the same VIM address may be different but all unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 8*80=640 instruction specified operations per cycle. As an example of the processing power this provides, a $VSP_{16}$ operating at 250 Mhz may achieve 640*250 Mhz=160 Giga operations per second.

The $VSP_{16}$ processor also uses an interconnection network cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation and other high compute functions, a hardware assist (HA) unit with advantageous independent connections to local PE memory is provided. A HA unit has one or more multi-cycle tightly coupled state machine functions which provide memory intensive application specific operational capability to each of the PEs in the $VSP_{16}$. For example, HA unit 147 interfaces with DSU 148 and LU 149 and the local data memory associated with PE4 114 as a transform engine 150.

Motion Search Refinement

The search is performed first at the full/integer pixel positions. A block of pixels of the current video frame, which is in the search range of a passed frame (in temporal order), is compared with all possible positions within the search range, looking for the smallest difference. For the best matching reference block, a motion vector is derived which describes the relative position of the two blocks.

The full search at the integer pixel positions produces motion vectors at 16×16 block level, extracting results for 16×8, 8×16, 8×8, and 4×4 blocks based on the sum of absolute difference (SAD) criterion for each particular block size and given search range. Next, partial search results (SAD for each current block position within the search range) are made available in multiple miscellaneous register file (MRF) registers and/or the HA/PE local memory for further processing by the search refinement engine.

The search refinement engine, which is the subject of this disclosure, performs half pixel interpolation on a two-dimensional full pixel window of 22×22 pixels by applying a 6-tap finite impulse response (FIR) filter in both horizontal and vertical directions. As the result of this step a new two-dimensional search window of 35×35 pixels is formed with interleaved existing full pixels and newly formed half pixel values.

The half pixel motion search refinement step is performed next by comparing the current MB pixels with the nearest neighbor half pixel values in 8 directions: horizontal left/right, vertical up/down, and four diagonal directions.

Luminance Interpolation for Fractional Sample Position

Figure 2:
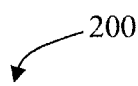
FIG. 2 illustrates a matrix with integer (A) and fractional sample positions, ½ (b, c) and ¼ (d, e, f, g, h), for luminance interpolation.

FIG. 2 illustrates a matrix 200 with integer (A) and fractional sample positions, ½ (b, c) and ¼ (d, e, f, g, h), for luminance interpolation. The positions labeled A in FIG. 2 represent reference picture samples in integer positions. Other symbols represent interpolated values at fractional sample positions.

The prediction values at integer positions are obtained by using the samples of the reference picture without alteration. The prediction values at half sample positions are obtained by applying a 6-tap filter with tap values [1, −5, 20, 20, −5, 1]. The prediction values at quarter sample positions are generated by averaging samples at integer and half sample positions. The process for each position is described below.

Samples at half sample positions labelled as '$b^h$' are obtained by first calculating intermediate value b applying the 6-tap filter to the nearest samples 'A' at integer positions in horizontal direction. The final value are calculated using $b^h = ((b+16)>>5)$. The samples at half sample positions labelled as '$b^v$' are obtained equivalently with the filter applied in vertical direction.

Samples at half sample positions labelled as '$c^m$' are obtained by applying the 6-tap filter to intermediate values b of the closest half sample positions in either vertical or horizontal direction to form an intermediate result c. The final value is calculated using $c^m = ((c+512)>>10)$.

Samples at quarter sample positions labelled as 'd', 'g', 'e' and 'f' are obtained by averaging with truncation the two nearest samples at integer or half sample position using $d=(A+b^h)>>1$, $g=(b^v+c^m)>>1$, $e=(A+b^v)>>1$, $f=(b^h+c^m)>>1$.

Samples at quarter sample positions labelled as 'h' are obtained by averaging with truncation the closest '$b^h$' and '$b^v$' samples in diagonal direction using $h=(b^h+b^v)>>1$.

Chrominance Interpolation for Fractional Sample Position

Figure 3:
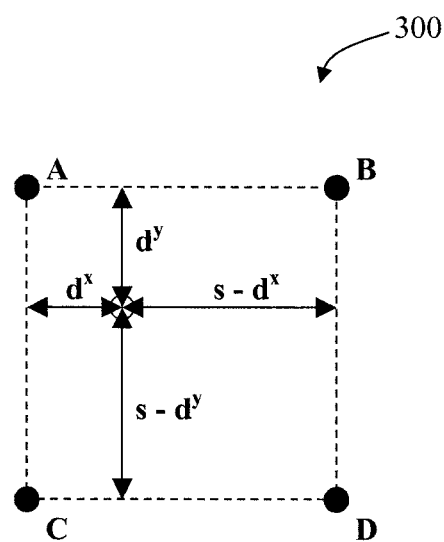
FIG. 3 illustrates a relationship matrix of fractional sample position dependent variables in chrominance interpolation and surrounding integer position samples A, B, C, and D.

FIG. 3 illustrates a relationship matrix 300 of fractional sample position dependent variables in chrominance interpolation and surrounding integer position samples A, B, C, and D. Fractional chrominance samples are obtained by using the equation:

$$v=((s-d^x)(s-d^y)A+d^x(s-d^y)B+(s-d^x)d^yC+d^xd^yD+s^2/2)/s^2,$$

where A, B, C and D are the integer position reference picture samples surrounding the fractional sample location. $d^x$ and $d^y$ are the fractional parts of the sample position in units of one eighth samples for quarter sample interpolation, and s is 8 for quarter sample interpolation. Relationships between the variables in the above equation and reference picture positions are illustrated in FIG. 3.

Hardware Assist for Half Pixel Refinement

Figure 4:
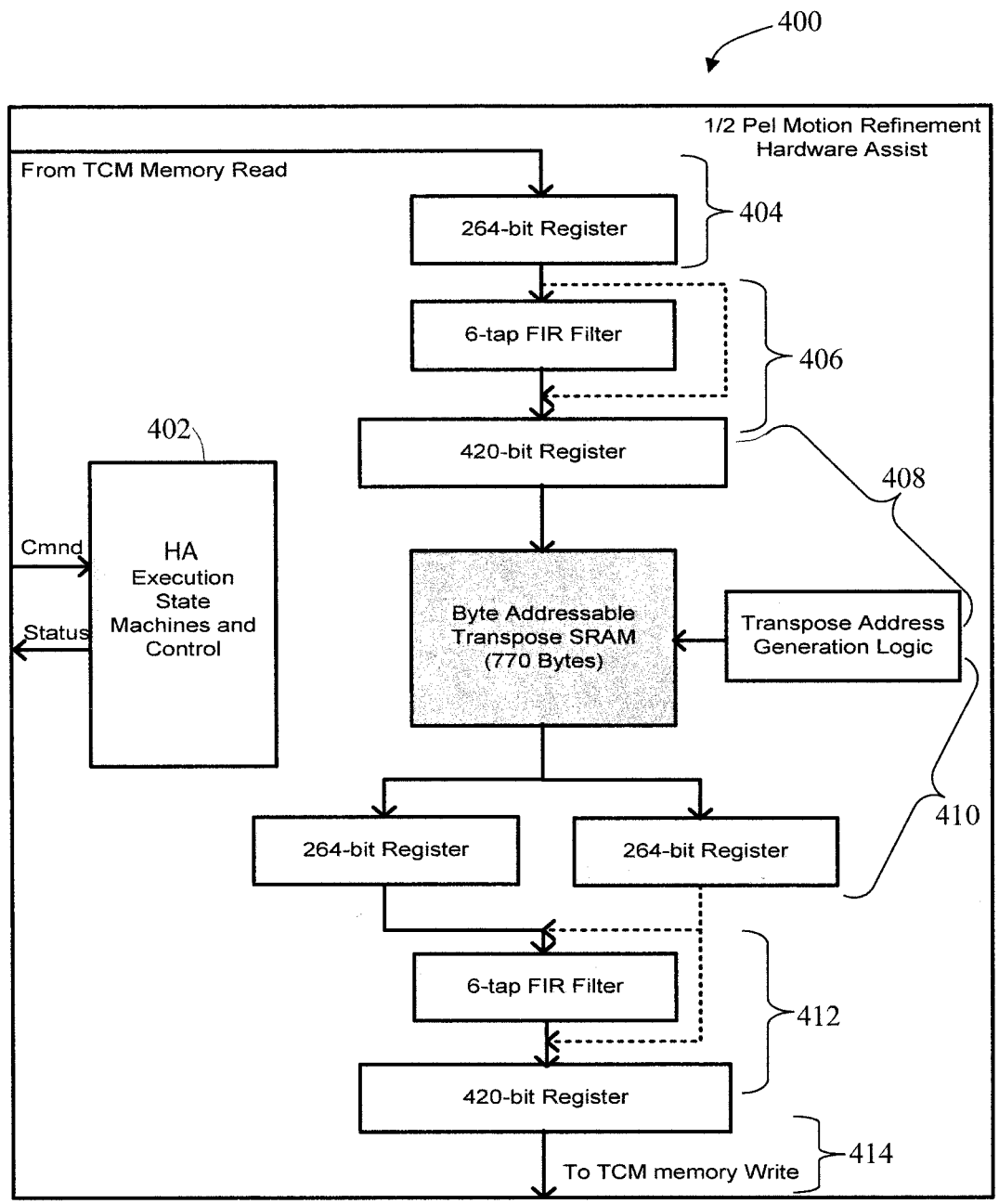
FIG. 4 illustrates a hardware assist block diagram for half pixel search window formation in accordance with the present invention.

FIG. 4 illustrates a hardware assist block diagram 400 for half pixel search window formation in accordance with the present invention. The register sizes are specified in terms of 12-bit pixels, allowing register subsets to support 10-bit pixels and 8-bit pixels. The motion search refinement operation is initiated by use of a motion search refinement instruction which may combine features of a processing element load instruction for passing address generation values and compute register file values to the motion search refinement hardware assist block. The execution pipeline consists of six multi-cycle stages under control of HA execution state machines and control unit 402:

1. PE/HA Memory Read 404
2. Row FIR Filtering 406
3. Transpose memory Write 408
4. Transpose memory Read 410
5. Column FIR Filtering 412
6. PE/HA Memory Write 414

The timing for input register load and FIR filtering stages is overlapped with the Transpose memory write cycles. The second pass of FIR filtering is overlapped with Transpose memory read cycles. The Transpose memory write and read steps are sequential operations giving a minimum of 2×770=1,540 cycles to complete the search window formation for ½ pixel motion search refinement process.

Figure 5:
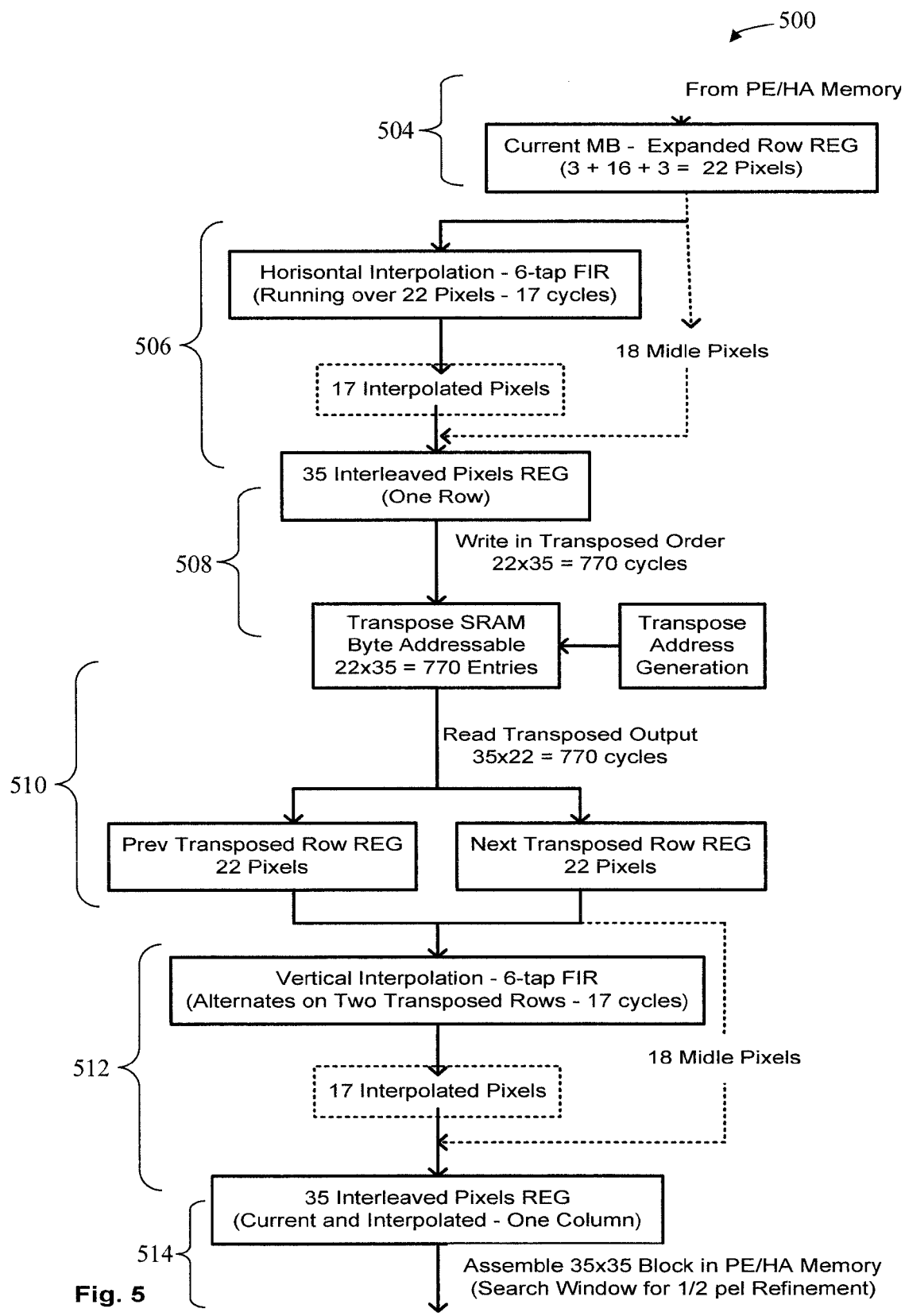
FIG. 5 illustrates a flowchart for a half pixel interpolation pipeline including general data flow information and general cycle timing for the various stages of the pipeline in accordance with the present invention.

FIG. 5 presents the flowchart 500 for a ½ pixel interpolation pipeline including general data flow information and general cycle timing for the various stages of the pipeline. The motion compensated search with ½ pixel accuracy is performed at eight ½ pixel neighboring positions with respect to the current best match. It is performed on the DSU_MS refinement hardware assist.

While the present invention has been disclosed in the context of various specific illustrative embodiments, it will be recognized that the invention may be suitably applied to other environments and applications consistent with the claims which follow.

We claim:

1. An apparatus for motion search refinement, the apparatus comprising:
   a row register configured to store a row of pixels from a (J+L+J)×(J+L+J) pixel window, wherein L is a number of the form $2^n$, n an integer greater than one, and J a positive integer;
   a first 2J-tap filter configured to operate on the pixels in the row register to produce row results that are interleaved with row pixels selected from the row register to form interpolated row results;
   a transpose storage unit configured to store the interpolated row results and configured to read the stored interpolated row results in transpose order to be written to pipelined registers as column pixels; and
   a second 2J-tap filter configured to operate on the column pixels selected from the pipelined registers to produce column results that are interleaved with column pixels selected from the pipelined register stages to form interpolated column results.

2. The apparatus of claim 1, wherein the row results are L+1 interpolated row pixels and the column results are L+1 interpolated column pixels.

3. The apparatus of claim 1 further comprising:
   a memory configured to hold the (J+L+J)×(J+L+J) pixel window which may be accessed for each J+L+J row of pixels.

4. The apparatus of claim 3, wherein the interpolated column results are stored in the memory to assemble a (2L+3)×(2L+3) search window for half pel refinement.

5. The apparatus of claim 1, wherein the apparatus for motion search refinement is initiated with a motion search refinement instruction commanded by a processing engine (PE).

6. The apparatus of claim 1 further comprising:
   a plurality of processing engines (PEs) configured as nodes in an array of PEs, wherein each PE is separately coupled to an associated apparatus for motion search refinement; and
   a plurality of memories, wherein each memory is separately coupled to an associated PE and to an associated apparatus for motion search refinement.

7. The apparatus of claim 1, wherein the transpose storage unit comprises:
   a byte addressable memory; and
   transpose address generation logic to selectively generate addresses to the byte addressable memory for storing the interpolated row results and for reading the interpolated row results in transpose order.

8. The apparatus of claim 1 further comprising:
execution state machines and control unit configured to control a motion search refinement execution pipeline in response to a motion search refinement instruction commanded by a processing engine (PE).

9. A method for motion search refinement in a processing engine (PE), the method comprising:
storing a row of pixels from a (J+L+J)×(J+L+J) pixel window in a row register, wherein L is a number of the form $2^n$, n an integer greater than one, and J a positive integer;
interpolating the pixels in the row register with a first 2J-tap filter configured to produce row results that are interleaved with row pixels selected from the row register to form interpolated row results;
storing the interpolated row results in a transpose storage unit;
reading the stored interpolated row results in transpose order from the transpose storage unit to be written to pipelined registers as column pixels; and
interpolating the column pixels selected from the pipelined registers with a second 2J-tap filter configured to produce column results that are interleaved with column pixels selected from the pipelined register stages to form interpolated column results.

10. The method of claim 9 further comprising:
initiating a motion search refinement operation with a motion search refinement instruction sent from the PE.

11. The method of claim 9, wherein the row results are L+1 interpolated row pixels and the column results are L+1 interpolated column pixels.

12. The method of claim 9, wherein the PE is coupled to a local memory configured to hold the (J+L+J)×(J+L+J) pixel window which may be accessed for each J+L+J row of pixels.

13. The method of claim 9 further comprising:
storing the interpolated column results in a local memory coupled to the PE to assemble a (2L+3)×(2L+3) search window for half pel refinement.

14. A method of pipelined motion search refinement operations, the method comprising:
reading row data in a hardware assist (HA) unit from a first memory and filtering the row data by a first finite impulse response (FIR) filter to produce row results that are interleaved with row pixels selected from the row data to form interpolated row results overlapped with writing of the row interpolation results to a transpose memory configured to operate in the HA unit, wherein the row data is a row of pixels from a (J+L+J)×(J+L+J) pixel window, L a number of the form $2^n$, n an integer greater than one, and J a positive integer; and
reading the row interpolation results in transpose order in the HA unit from the transpose memory to be stored in pipelined registers as column pixels overlapped with filtering by a second FIR filter the stored column pixels to produce column results that are interleaved with column pixels selected from the pipelined registers to form interpolated column results and storing the interpolated column results in the first memory to assemble a (2L+3)×(2L+3) search window.

15. The method of claim 14 further comprising:
initiating in parallel a plurality of pipelined motion search refinement operations in a plurality of hardware assist (HA) units, wherein each HA unit is separately coupled to an associated processing engine (PE) of a plurality of PEs and separately coupled to an associated memory of a plurality of memories and wherein the associated memory is separately coupled to the associated PE.

16. The method of claim 15, wherein the initiating comprises:
receiving in each PE of the plurality of PEs a motion search refinement instruction which initiates the motion search refinement operation in each HA unit.

17. The method of claim 14, wherein a first overlapping comprises:
reading the row data from a (J+L+J)×(J+L+J) pixel window stored in the first memory, wherein the row data is read as separate rows of J+L+J pixels;
filtering each of the separate rows of J+L+J pixels with the first FIR filter to generate the row results which are interleaved with the row pixels to produce the interpolated row results; and
writing the row interpolation results to the transpose memory, wherein the writing the row interpolation results is overlapped with the reading the row data and the filtering to produce the interpolated results.

18. The method of claim 14, wherein a second overlapping comprises:
reading the column pixels from the transpose memory;
filtering the column pixels with the second FIR filter; and
writing the interpolated column results to the first memory, wherein reading the column pixels is overlapped with filtering the column pixels.

19. The method of claim 14, wherein the pipelined motion search refinement operations are controlled by an execution state machines and control unit configured to operate in the HA unit.

20. The method of claim 14, further comprising:
comparing a current best match block from the (2L+3)×(2L+3) search window with nearest neighbor half pixel values in eight directions, wherein the eight directions includes horizontal left/right, vertical up/down, and four diagonal directions.

* * * * *